United States Patent Office 3,346,598
Patented Oct. 10, 1967

3,346,598
ANHYDRIDES AND ESTERS OF 1,2,3,4-CYCLO-
PENTANETETRACARBOXYLIC ACID
Ross Van Volkenburgh, Baton Rouge, Harold W. Hyde,
Natchitoches, and Grover C. Royston, Baton Rouge,
La., assignors to Copolymer Rubber & Chemical Corporation, a corporation of Louisiana
No Drawing. Filed Jan. 27, 1964, Ser. No. 340,518
34 Claims. (Cl. 260—346.3)

This invention broadly relates to novel esters of 1,2,3,4-cyclopentanetetracarboxylic acid and to processes for their preparation. The invention further relates to processes in which the novel esters of the invention or their simple derivatives are employed as surface active agents, foaming agents, ingredients in emulsion polymerization recipes, monomers in free radical polymerizations, curing agents for synthetic organic resins, plasticizing agents and lubricants.

1,2,3,4-cyclopentanetetracarboxylic acid and its mono- and dianhydride derivatives have been prepared heretofore. Several methyl or ethyl esters of 1,2,3,4-cyclo-pentanetetracarboxylic acid also are known, but higher esters have not been prepared and their many unusual and unexpected properties were unknown prior to the present invention. The methyl and ethyl esters and their simple derivatives are not useful as surface active agents, foaming agents, emulsifiers for emulsion polymerizations, plasticizing agents, lubricants, etc. and thus they have not been commercially successful.

It is an object of the present invention to provide novel esters of 1,2,3,4-cyclopentanetetracarboxylic acid and processes for their preparation.

It is still a further object to provide novel tetraesters of 1,2,3,4-cyclopentanetetracarboxylic acid which are useful as lubricants and plasticizing agents.

It is still a further object to provide novel mono- and diesters of a monoanhydride of 1,2,3,4-cyclopentanetetracarboxylic acid which are useful as curing agents for epoxy resins.

It is still a further object to provide novel esters of the foregoing classes and processes for their preparation wherein the 1,2,3,4-cyclopentanetetracarboxylic acid is cis,cis,cis,cis-1,2,3,4-cyclopentanetetracarboxylic acid.

It is still a further object to provide an improved process for preparing foams.

It is still a further object to provide novel high molecular weight polymers and a process for their preparation.

It is still a further object to provide an improved process for the emulsion polymerization of monomeric material.

It is still a further object to provide a novel method of lubricating surfaces in frictional engagement.

It is still a further object to provide a novel process for plasticizing synthetic organic resins.

It is still a further object to provide a novel process for curing epoxy resins.

Still other objects and advantages of the invention will be apparent to those skilled in the art upon reference to the following detailed description and the examples.

In accordance with one important variant of the invention, novel esters of 1,2,3,4 - cyclopentanetetracarboxylic acid are provided having the formula

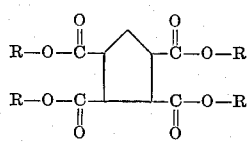

wherein the four R groups are monovalent substituents selected from the group consisting of monovalent organic radicals containing 4 through 24 carbon atoms, hydrogen, alkali metal, alkaline earth metal, ammonium ion and mixtures thereof, and at least one of the R groups is a monovalent organic radical containing 4 through 24 carbon atoms. In accordance with still other variants of the invention, mono- and diesters of monoanhydrides of 1,2,3,4-cyclopentanetetracarboxylic acid are provided wherein each alcoholic residue of the mono- and diester groups contains 4 through 24 carbon atoms.

Various stereoisomers of 1,2,3,4-cyclopentanetetracarboxylic acid may be employed as the tetracarboxylic acid in practicing the present invention. However, it is often preferred to use the cis,cis,cis,cis-stereoisomer which is readily available by nitric acid oxidation of the Diels-Alder adduct of cyclopentadiene and maleic anhydride. In instances wherein esters of 1,2,3,4-cyclopentanetetracarboxylic acid or its monoanhydride are referred to in the specification and claims, it is understood that this terminology includes esters of the type described herein prepared from 1,2,3,4-cyclopentanetetracarboxylic acid and its derivatives, including the alkali and alkaline earth metal salts thereof and the monoanhydride dianhydride derivatives, and thus the terminology is not limited to only esters produced from the free acid per se.

The alcohols used in preparing the esters contain four or more carbon atoms, and preferred alcohols include those in which there is no branching of the carbon chain, and especially substitution of alkyl or other large groups on either the alpha or beta carbon atoms. Primary alcohols are preferred although secondary alcohols may be used in which case esterification is more difficult. As a general rule tertiary alcohols do not give as good results as do primary or secondary alcohols. The alcohols may be acyclic, cyclic or heterocyclic, or they may contain heterocyclic or aryl rings attached to the carbon atoms to which the primary or secondary alcohol group is attached. The alcohols may be saturated or unsaturated.

The organic radicals R in the foregoing formula for certain esters of the invention, or the alcoholic residue for the ester groups of the mono- and diesters of monoanhydrides of 1,2,3,4-cyclopentanetetracarboxylic acid, must each contain at least four carbon atoms and for better results at least six or eight carbon atoms. Preferably, each R group or alcoholic residue contains 6 or 8 through 16 carbon atoms, and for best results in many instances 8 through 10 carbon atoms. Usually, the number of carbon atoms in each R group or alcoholic residue should not exceed 24. Specific examples of alcohols which have been found to produce desirable mono-, di-, tri- or tetraesters include butyl alcohol, isobutyl alcohol, amyl alcohol, isoamyl alcohol, n-hexyl alcohol, isohexyl alcohol, heptyl alcohol, isoheptyl alcohol, n-octyl alcohol, isooctyl alcohol, n-decyl alcohol, isodecyl alcohol, cetyl alcohol, stearyl alcohol, etc. The term "alcoholic residue" as broadly used herein is understood to refer to the monovalent organic radicals attached to oxygen atoms of the ester groups which are not derived from the acid portion of the ester molecule. Thus, while the alcoholic residue are often derived from an alcohol, such as by reaction of the acid or anhydride with an alcohol to form the ester, this is not always necessary as the ester may be prepared by reaction of an alkali metal salt of 1,2,3,4-cyclopentanetetracarboxylic acid and an alkyl halide.

A variety of processes may be used to prepare the mono-, di-, tri- and tetra esters of 1,2,3,4-cyclopentanetetracarboxylic acid, and the mono- and diesters of monoanhydrides of 1,2,3,4-cyclopentanetetracarboxylic acid. Examples of processes are as follows:

(1) Reaction of 1,2,3,4-cyclopentanetetracarboxylic acid with a desired alcohol in the presence of an acid esterification catalyst to produce the mono-, di-, tri- or tetraester. In instances where a monoester is to be prepared, the alcohol is present and reacted in equimolar quantities with the tetraacid; when a diester is to be prepared, two moles of the alcohol are present and reacted with each mole of the tetraacid; when a triester is to be prepared, three moles of the alcohol are present and reacted with each mole of the tetraacid; and where a tetraester is desired, four or more moles of the alcohol are present and reacted with each mole of the tetraacid.

(2) Reaction of the dianhydride of 1,2,3,4-cyclopentanetetracarboxylic acid with the desired alcohol in the absence of an esterification catalyst to produce the corresponding diester of 1,2,3,4-cyclopentanetetracarboxylic acid. If desired the tri- or tetraester may be prepared therefrom by addition of the same alcohol or a different alcohol in an equimolar amount or two moles of the alcohol for each mole of the acid, respectively, and the resulting mixture is reacted in the presence of an acid esterification catalyst to produce the tri- or tetraester, respectively.

(3) Reaction of a desired alcohol with the monoanhydride of 1,2,3,4-cyclopentanetetracarboxylic acid in the absence of an esterification catalyst to produce the corresponding monoester of 1,2,3,4-cyclopentanetetracarboxylic acid. The diester, triester or tetraester may be prepared from the monoester by reaction of each molar amount thereof with 1, 2 or 3 moles, respectively, of the same or a different alcohol in the presence of an acid esterification catalyst to produce the corresponding di-, tri- or tetraester, respectively.

(4) Reaction of the sodium salt of 1,2,3,4-cyclopentanetetracarboxylic acid with the desired alkyl halide to produce the corresponding ester. The monoester may be prepared when equimolar quantities of the sodium salt and alkyl halide are reacted, the diester when 2 moles of the alkyl halide are reacted with each mole of the sodium salt, the triester when 3 moles of the alkyl halide are reacted with each mole of the sodium salt, and the tetraester when 4 moles of the alkyl halide are reacted with each mole of the sodium salt.

(5) Higher mono-, di-, tri- or tetraesters may be prepared by transesterification wherein lower mono-, di-, tri- or tetraesters, respectively, of 1,2,3,4-cyclopentanetetracarboxylic acid are reacted with the desired higher alcohol in the presence of a transesterification catalyst.

(6) The monoanhydride of 1,2,3,4-cyclopentanetetracarboxylic acid may be reacted in the absence of an esterification catalyst, with a desired alcohol to produce the corresponding monoester, and the resulting monoester may be dehydrated by thermal dehydration such as by distillation at elevated temperature under reduced pressure, or by reaction with an organic anhydride such as acetic anhydride, to produce the corresponding monoester of the monoanhydride of 1,2,3,4-cyclopentanetetracarboxylic acid.

(7) The dianhydride of 1,2,3,4-cyclopentanetetracarboxylic acid may be reacted in the absence of an esterification catalyst with a desired alcohol to produce the corresponding diester, and the resulting diester may be dehydrated by thermal dehydration such as by distillation at elevated temperature under reduced pressure, or with an organic anhydride such as acetic anhydride, to produce the corresponding diester of the monoanhydride of 1,2,3,4-cyclopentanetetracarboxylic acid.

The mono-, di- and triesters of 1,2,3,4-cyclopentanetetracarboxylic acid is prepared above contain 3, 2 and 1, respectively, free carboxylic acid groups which are capable of forming salts of soaps of various metals, including the alkali metals and alkaline earth metals, and also ammonium soaps. The salts or soaps may be conveniently prepared by contacting the ester with an aqueous solution which contains, for example, 1-3 chemical equivalents of the desired metal ion or ammonium ion for each carboxylic acid group to be reacted therewith. For instance, when preparing sodium, potassium or ammonium soaps, the mono-, di- or triesters may be reacted with 1-3 moles of sodium, potassium or ammonium hydroxide for each gram atomic ion of acidic hydrogen present on free carboxylic acid groups to be saponified, although much larger amounts of sodium, potassium or ammonium hydroxide may be present when it is desired to prepare a strongly alkaline solution of the resulting soap. Alkaline earth metal salts or other metal salts also may be prepared following this procedure.

The sodium, potassium and ammonium soaps prepared above are surprisingly soluble in water, and aqueous solutions up to 35% by weight or higher may be obtained as very fluid solutions. Solutions containing 15-20 to 25-35% by weight of the soap are especially desirable in many instances, such as in the manufacture of foamed rubber from latex or in prior art processes in general using long chain fatty acid soaps as a foaming agent. The highly concentrated aqueous solutions of the soaps are especially useful in environments where it is desired to produce a stable foam of an aqueous medium. The soaps are excellent surface active agents and readily lower the surface tension of aqueous media. Certain soaps such as the sodium, potassium and ammonium salts of mono- and diesters of alcohols containing 8–10 carbon atoms are effective in lowering the surface tension of water. Esters of alcohols containing less than 8 carbon atoms, or more than about 16–18 carbon atoms, are less effective as surface active agents than esters of alcohols containing 8–10 carbon atoms.

Mono- and diester soaps described above are especially useful as emulsifiers in aqueous emulsion polymerization processes. This is unexpected as many soaps do not support emulsion polymerization effectively, and especially soaps of synthetic polycarboxylic acids. When using the ester soaps of the invention as emulsifiers, they may be substituted in prior art aqueous emulsion polymerization recipes, and especially prior art "hot" or "cold" recipes for the copolymerization of butadiene and styrene. Examples of polymerizable monomeric materials include chloroprene, the various 1,3-butadienes such as 1,3-butadiene, methyl 2-butadiene-1,3, piperylene, and 2,3-dimethylbutadiene-1,3. If desired, the monomeric material may be a mixture of a 1,3-butadiene such as 1,3-butadiene with another copolymerizable material which is capable of forming copolymers therewith. For example, the monomeric material may be a polymerizable mixture containing up to 50%, or higher in some instances, of a compound which contains a $CH_2=C=$ group wherein at least one of the disconnected valences is attached to an electroactive group, i.e., a group which substantially increases the electrical dissymmetry or polar character of the molecule. Examples of compounds containing the aforementioned group are the aryl olefins, such as styrene and vinyl naphthalene; the alpha methylene carboxylic acids and their esters, nitriles and amines, such as acrylic acid, methylacrylate, methyl methacrylate, acrylonitrile, methacrylonitrile and methacrylamide; isobutylene; methyl vinyl ether; and methyl vinyl ketone. In some instances, the monomeric material may be a single compound containing a $CH_2=C=$ group or a mixture of such compounds. The polymerizable monomeric materials suitable for practicing the invention may be referred to herein as being selected from the group consisting of chloroprene, conjugated diolefins homopolymerizable to produce polymers and mixtures of conjugated diolefins and monoethylenically unsaturated monomers copolymerizable to produce copolymers, and preferably rubbery homopolymers or copolymers. The preferred monomeric material for many uses is a mixture of butadiene and styrene, and especially mixtures wherein the styrene content is less than about 50% by weight.

The polymerization recipe may contain one or more micelle forming surfactants of the same type as employed in prior art emulsion polymerization recipes in addition to the ester soaps of the invention. Examples of other surfactants are the fatty acid soaps and especially water soluble, long chain fatty acid soaps such as sodium or potassium laurate, myristate, palmitate, oleate, stearate, etc., and the water soluble sodium or potassium soaps of tall oil and the rosin soaps, including disproportionated rosin soaps. If desired, a secondary emulsifier may be present, which may be a prior art synthetic detergent. Examples of secondary emulsifiers include the alkali metal sulfonates derived from aryl sulfonic acids such as sodium alkyl naphthalene sulfonate.

The polymerization recipe also may contain a polymerization catalyst, which likewise may be of a prior art type useful in the emulsion polymerization of the monomeric material. The catalyst may be a free radical initiator, and satisfactory catalysts include organic hydroperoxides such as paramethane hydroperoxide, cumene hydroperoxide and diisopropyl benzene hydroperoxide. A prior art activator may be present in redox combination such as ferrous sulfate or other suitable ionizable heavy metal catalyst salts. Additionally, other substances may be present in the recipe in accordance with prior art practice.

When unsaturated alcohols are employed in preparing monoesters of 1,2,3,4-cyclopentanetetracarboxylic acid, the resulting monoesters are useful as monomers in preparing linear polymers by free radical polymerization and in polyester formulations. In instances where unsaturated alcohols are used in preparing diesters, triesters or tetraesters of 1,2,3,4-cyclopentanetetracarboxylic acid, then the resulting esters are useful as monomers in preparing linear or crosslinked polymers by free radical polymerization, in modifying polymerizable mixtures, or as crosslinking agents and especially as crosslinking agents for polyester formulations. Linear polymers may be prepared from the di-, tri- or tetraesters, and then crosslinked or cured in the presence of a free radical catalyst. Thus, it is apparent that the unsaturated esters of the invention are useful in preparing a wide variety of polymers and especially polyesters.

The tetraesters of 1,2,3,4-cyclopentanetetracarboxylic acid also are especially useful as lubricants and as plasticizing agents for organic resins. For instance, the tetraesters may be substituted for prior art lubricating oils to reduce friction between surfaces subject to frictional engagement. When used as lubricants, it is only necessary that the prior art lubricant be replaced in whole or in part by the tetraester lubricants described herein. When using the tetraesters as plasticizing agents for vinyl or other resins, it is likewise only necessary that the plasticizers of the prior art, or a portion thereof, be replaced with the tetraester plasticizers of the invention. The method of incorporating the plasticizer in the resin, or the quantities to be used, may be substantially the same as employed in the prior art. However, it is often preferred to employ about 30–100% and preferably about 40–70% o fthe tetraester plasticizers for each 100 parts by weight of the vinyl or other organic resin.

The mono- and diesters of monoanhydrides of 1,2,3,4-cyclopentanetetracarboxylic acid are especially useful as curing agents for epoxy and other organic resins which are curable with organic anhydrides, including polymers containing hydroxyl groups, amine groups, thiol groups, and substituents in general having a hydrogen atom which is sufficiently reactive to add to a carboxylic acid anhydride. Specific examples of suitable polymers which may be cured with the mono- and diesters of the monoanhydrides of 1,2,3,4-cyclopentanetetracarboxylic acid include epoxy resins, urethanes, polyesters containing hydroxyl groups or other source of active hydrogen, polyvinyl alcohol and polysiloxanes containing active hydrogen-containing side groups. Preferably the active hydrogen is contained in a group attached directly to a carbon atom of the polymer backbone although in some instances the active hydrogen may be present in side chains such as in polysiloxanes.

Epoxy compounds or resins which may be cured with the mono- and diesters of monoanhydrides of 1,2,3,4-cyclopentanetetracarboxylic acid include those containing at least two epoxy groups per molecule. One known process for preparing epoxy resins is by reaction of an epihalohydrin and a dihydric compound such as dihydric phenol. Other general methods of preparation and formulations are well known and are described in the literature, such as in the text "Epoxy Resins, Their Application and Technology" by Henry Lee and Kris Neville, McGraw-Hill, 1957. Other references disclosing epoxy resins and/or processes for curing epoxy resins, the teachings of which are incorporated herein by reference, including United States Patents 2,871,221, 2,884,406, 2,890,204, 2,890,210, 2,915,494, 2,947,712, 2,947,717, 2,935,492, 2,949,441, 2,948,705, 2,951,778 and 2,955,101. Many commercially available epoxy resins which may be used are Bakelite ERL–2774 and 3794, Epi-Rez 510 and Epon 826 and 828. If desired, the amount of carboxylic acid anhydride and the conditions of cure need not differ from prior art practices when the mono- and diesters of monoanhydrides of 1,2,3,4-cyclopentanetetracarboxylic acid are employed.

The foregoing detailed description and the following specific examples are for purposes of illustration only and are not intended as being limiting to the spirit or scope of the appended claims.

*Example I*

This example illustrates the preparation of monoesters of 1,2,3,4-cyclopentanetetracarboxylic acid.

In a 100 milliliter flask fitted with reflux condenser was placed 22.8 grams (0.10 mole) of the monoanhydride of cis,cis,cis,cis-1,2,3,4-cyclopentanetetracarboxylic acid, 7.4 grams (0.10 mole) of n-butyl alcohol and 55 cc. of acetone. The resulting mixture was refluxed for 2 hours, then filtered while hot and the acetone solvent removed under reduced pressure by means of a rotary evaporator. The residue of the resulting oily mono-n-butyl ester of cis,cis,cis,cis - 1,2,3,4 - cyclopentanetetracarboxylic acid weighed 28.3 grams (93.6% of theory) and the neutralization equivalent was 102 (theory for the mono-n-butyl ester of 1,2,3,4-cyclopentanetetracarboxylic acid is 101).

*Example II*

The procedure of Example I was repeated to prepare the methyl, ethyl, n-hexyl, n-octyl, decyl and hexadecyl monoesters of cis,cis,cis,cis-1,2,3,4-cyclopentanetetracarboxylic acid. In preparing these esters, the procedure of Example I was followed with the exception of substituting methyl, ethyl, n-hexyl, n-octyl, decyl or hexadecyl alcohol for the n-butyl alcohol. The corresponding monesters were prepared readily in each instance and the results thus obtained were comparable to those of Example I.

*Example III*

This example illustrates the preparation of soaps from the various monoesters of 1,2,3,4-cyclopentanetetracarboxylic acid prepared in Examples I and II.

Each of the monoesters prepared in Examples I and II from 0.1 mole of the alcohol and 0.1 mole of the monoanhydride of 1,2,3,4-cyclopentanetetracarboxylic acid was reacted with 11.5 grams of sodium hydroxide dissolved in 100 milliliters of water to produce very fluid solutions of the resulting trisodium salts or soaps. The soap solutions were clear and very fluid even at concentrations of 25–35% by weight or higher, and unlike soap solutions of similar concentrations obtained from long chain fatty acid soap.

It was also possible to prepare the corresponding tripotassium salts or soaps by substituting equimolar amounts of potassium hydroxide for the sodium hydroxide for the sodium hydroxide above used. The soap solutions were crystal clear with the exception of the mono-hexadecyl ester potassium soap which was white.

It is also possible to prepare the corresponding triammonium salts or soaps following the above procedure by substituting equimolar amounts of ammonium hydroxide for the sodium or potassium hydroxide to obtain comparable results.

Samples of several of the above prepared monoester soap solutions were adjusted by addition of water to soap concentrations of 5 or 20 weight percent and the viscosities of the resulting solutions were compared with that of a 5.5 weight percent aqueous solution of sodium oleate. The following viscosities were obtained at 25° C.:

| Ester | Weight percent of soap | Viscosity in centistokes |
|---|---|---|
| Mono-n-butyl | 20.0 | 2.09 |
| Mono-n-hexyl | 20.0 | 2.86 |
| Mono-n-octyl | 20.0 | 2.51 |
| Decyl | 20.0 | 2.82 |
| Mono-n-octyl | 5.0 | 1.10 |
| Sodium oleate | 5.5 | 1.48 |
| Do | 15.0 | (¹) |

¹ Too viscous to handle readily.

From the above data, it is apparent that on a weight basis aqueous solutions of the monoester soaps prepared in accordance with the present invention are very fluid, as compared with aqueous solutions of sodium oleate. The above monoester soaps could be prepared as fluid solutions in desired concentrations up to 35 weight percent or higher, and especially concentrations of 20–35% by weight, which is very surprising and much higher than it is possible to obtain using prior art long chain fatty acid soaps.

The concentrated aqueous monoester soap solutions prepared above are especially useful as surface active agents in general, including emulsion polymerization, and as foaming agents such as in the manufacture of foamed rubber articles and other foamed products.

*Example IV*

Each of the monoester soaps prepared in accordance with the procedure of Example III was examined for its effect on the surface tension of distilled water and compared with the effect of sodium oleate.

In this example, samples of the series of monoester soap solutions prepared in accordance with Example III were diluted to prepare 5.0 weight percent solutions and increments of each 5 weight percent soap solution were added by syringe to 100 milliliter portions of distilled water. The resulting mixtures were stirred for one minute after each incremental addition of soap, the surface tension was determined using a Cenco-Du Nouy interfacial tensiometer and the data were recorded.

A standard aqueous solution of sodium oleate was prepared for comparison with the experimental soap solutions of Example III and the concentration was determined by a conductometric titration and found to be 5.48%. This solution was used as described above for the monoester soap solutions to obtain comparative data.

The following data were obtained:

EFFECT OF SOAPS OF MONOESTERS ON AQUEOUS SURFACE TENSION

| Ml. soap/100 ml. H₂O | Ester | | | | | | | |
|---|---|---|---|---|---|---|---|---|
| | (a) | $C_1$ | $C_2$ | n-$C_4$ | n-$C_6$ | n-$C_8$ | $C_{10}$ | $C_{16}$ |
| | Surface Tension, dynes/cm. | | | | | | | |
| 0 | 74.5 | 71.4 | 72.5 | 74.4 | 69.1 | 75.2 | 71.9 | 71.5 |
| 1 | 28.3 | 73.0 | 72.5 | 71.3 | 70.1 | 45.4 | 42.7 | 47.5 |
| 2 | 28.2 | 72.5 | 72.5 | 70.0 | 69.1 | 34.6 | 35.9 | 45.5 |
| 5 | 28.2 | 73.8 | 72.6 | 65.5 | 65.7 | 34.0 | 30.9 | 38.2 |
| 10 | 28.2 | 70.9 | 72.7 | 62.6 | 58.6 | 29.7 | 29.2 | 35.5 |
| 15 | 28.2 | 70.2 | 69.6 | 61.4 | 53.4 | 28.7 | 28.7 | 34.1 |
| 20 | 28.2 | 70.3 | 68.3 | 58.3 | 52.4 | 28.6 | 28.7 | 33.0 |
| 25 | 28.2 | | | | 50.5 | | | |

(a) 5.48% Na-oleate.

From the above data, it is apparent that the methyl and ethyl monoester salts have substantialy no effect on the surface tension of water, and the mono-n-butyl and mono-n-hexyl ester soaps do not have a pronounced effect. However, the 5.0% by weight solutions of monoester soaps prepared from alcohols containing 8 or 10 carbon atoms lowered the surface tension markedly to only about 28.6–28.7 dynes/cm. The hexyldecyl monoester soap is also very effective in reducing the surface tension of water.

*Example V*

This example illustrates the use of monoester soaps prepared following the procedure of Example III in the aqueous emulsion copolymerization of butadiene and styrene using a "hot rubber" recipe. The specific soaps employed in this example were the trisodium salts or soaps of the n-butyl, n-hexyl, n-octyl, decyl and hexadecyl monoesters of 1,2,3,4-cyclopentanetetracarboxylic acid.

The following ingredients were charged to standard polymerization bottles for laboratory polymerizations:

| Ingredients: | Parts by weight |
|---|---|
| Butadiene | 70.0 |
| Styrene | 30.0 |
| Emulsifier (monoester sodium soap) | 4.50 |
| Sodium alkyl naphthalene sulfonate | 0.40 |
| $K_2S_2O_8$ | 0.50 |
| Sulfole (isopentadecane mercaptan) | 0.20 |
| Water | 180.00 |

The above recipe was charged to a series of standard polymerization bottles for conducting polymerizations following laboratory techniques and the polymerization was allowed to proceed at a temperature of 50° C. until expiration of the indicated reaction time. Then, the final percent latex solids, pH, prefloc and latex particle size were determined. The following results were obtained:

| Emulsifier | Reaction Time (hrs.) | Final Percent Total Latex Solids | pH | Prefloc | Latex Particle Size (A.) |
|---|---|---|---|---|---|
| n-Butyl | | | | (¹) | |
| n-Hexyl | 21 | 10.4 | 9.5 | 16.2 | 2,105 |
| n-Octyl | 21 | 33.0 | 9.0 | 2.4 | 940 |
| Decyl | 21 | 33.2 | 9.2 | Nil | 1,050 |
| Hexadecyl | 20¼ | 30.1 | 10.1 | (²) | 850 |

¹ Total floc.
² Substantial.

From the above data, it is apparent that the n-butyl monoester soap does not support polymerization at the above emulsifier level. However, it is possible to use more emulsifier or use this emulsifier in combination with other emulsifiers. The n-hexyl monoester did support polymerization although 16.2% prefloc was formed. The n-octyl and decyl monoesters were excellent emulsifiers and little, if any prefloc was formed. The hexadecyl monoester supported polymerization, although a substantial amount of prefloc was formed.

*Example VI*

This example illustrates the use of monoester soaps prepared in accordance with Example III in aqueous emulsion polymerization recipes for cold rubber.

The sodium soaps of the n-butyl, n-hexyl, n-octyl, decyl and hexadecyl monoesters of 1,2,3,4-cyclopentanetetracarboxylic acid were used as emulsifiers in the following recipe:

| Ingredient: | Parts by weight |
|---|---|
| Butadiene | 70.0 |
| Styrene | 30.0 |
| Emulsifier (monoester sodium soap) | 4.50 |
| Sodium alkyl naphthalene sulfonate | 0.40 |
| Sodium formaldehyde sulfoxylate | 0.05 |
| Tetrasodium salt of ethylenediamine tetraacetate | 0.015 |
| $Na_2S_2O_4 \cdot 2H_2O$ | 0.02 |
| Activator solution [1] | 0.90 |
| Trisodium phosphate | 0.20 |
| Potassium chloride | 0.20 |
| Diisopropyl benzene hydroperoxide | [2] 0.05 |
| Sulfole | 0.07 |
| Water | 180.00 |

[1] The activator was a solution of 1.27 grams of sodium hydroxide, 2.31 grams of the tetrasodium salt of ethylenediaminetetraacetic acid and 2.0 grams of ferrous sulfate heptahydrate in water made up to 100 milliliters.
[2] An additional 0.05 part was added during the reaction.

The above recipe was charged to a series of standard polymerization bottles for conducting polymerizations following laboratory techniques and the polymerization was allowed to proceed at a temperature of 5° C. until expiration of the indicated reaction time. The following results were obtained:

| Emulsifier | Reaction Time (hrs.) | Final Percent Total Latex Solids | pH | Prefloc | Latex Particle Size (A.) |
|---|---|---|---|---|---|
| n-Butyl | | | | | |
| n-Hexyl | | | | | |
| n-Octyl | 54¼ | 23.8 | 10.2 | Nil | 975 |
| Decyl | 54¼ | 30.0 | 10.5 | Nil | 845 |
| Hexadecyl | 4½ | 16.3 | 10.6 | ([1]) | 925 |

[1] Substantial.

The n-butyl and n-hexyl monoester soap runs failed to react under the above conditions. It was also necessary to add additional diisopropyl benzene hydroperoxide to the runs for the n-octyl and decyl monoester soaps to sustain the reaction. However, the latices obtained in the runs for the n-octyl and decyl monoester soaps were stable and had the appearance of normal, small particle size latices. The hexadecyl monoester soap supported polymerization under the above conditions but the resulting latex contained a substantial amount of prefloc.

*Example VII*

This example illustrates the preparation of diesters of 1,2,3,4-cyclopentanetetracarboxylic acid.

To a 200 milliliter flask fitted with reflux condenser was added 21.0 grams (0.10 mole) of the dianhydride of cis,cis,cis,cis-1,2,3,4-cyclopentanetetracarboxylic acid and 22.4 grams (0.22 mole) of n-hexyl alcohol. The mixture was heated to reflux and maintained at this temperature for one hour. Then, the flask was fitted with a capillary tube to admit dry gaseous nitrogen and was evacuated by means of a water aspirator to remove the residual unreacted alcohol. The resulting di-n-hexyl ester of 1,2,3,4-cyclopentanetetracarboxylic acid was obtained as a clear, yellow viscous liquid in a yield of 39.7 grams which was 96% of theory. The neutralization equivalent of the product was 211 (theory 207).

*Example VIII*

The procedure of Example VII was repeated with the exception of substituting various other alcohols in the same relative molar quantities of the dianhydride to the alcohol. In this manner, the methyl, n-butyl, t-butyl, cyclohexyl, n-octyl, 2-ethylhexyl, decyl and hexadecyl diesters of cis,cis,cis,cis-1,2,3,4-cyclopentanetetracarboxylic acid were prepared. The properties of diesters prepared in Examples I and II are given below:

| Diester | Mol. Wt. | Physical Appearance | M.P., ° C. | Estimated B.P., ° C. | Refractive Index, $n_D^{20}$ | Brookfield Viscosity, cps. |
|---|---|---|---|---|---|---|
| Methyl | 274 | White powder | 176 | | | |
| n-Butyl | 358 | Viscous oil to glass | | 350–375 | 1.4755 | 22,000 |
| t-Butyl | 358 | do | | | | |
| Cyclohexyl | 410 | do | | | | |
| n-Hexyl | 414 | do | | 460 | 1.4725 | 6,000 |
| n-Octyl | 470 | do | | | 1.4720 | 4,700 |
| 2-ethylhexyl | 470 | do | | 375–400 | 1.4725 | 11,000 |
| Decyl | 526 | do | | | | |
| Hexadecyl | 694 | do | | | | |

Solubility tests made on the diesters of butyl, n-hexyl, n-octyl, 2-ethylhexyl, cyclohexyl alcohols show solubility in benzene, toluene, acetone, alcohols, and acetic acid. The n-hexyl ester was soluble in n-hexane and in ethyl ether.

*Example IX*

The procedure of Example VII was followed with the exception of reacting 21.1 grams (0.10 mole) of the dianhydride of 1,2,3,4-cyclopentanetetracarboxylic acid and 100 milliliters (about 1.1 moles) of n-butyl alcohol. The mixture was heated at reflux temperature for 1⅔ hours and was then transferred to a rotary evaporator where the excess alcohol was removed at reduced pressure at a temperature of 100° C. A very viscous liquid product containing the di-n-butyl ester of 1,2,3,4-cyclopentanetetracarboxylic acid was obtained which was passed through a molecular still at a pressure of 50 microns of mercury to remove trace amounts of alcohol. The distillate was a clear colorless liquid having a viscosity of about 20,000 cps. at 25° C. The refractive index was $n_D^{20}$ 1.4755. The neutralization equivalent was 181 (theory for the n-butyl diester-diacid of 1,2,3,4-cyclopentanetetracarboxylic acid is 178) and the saponification equivalent was 89.0 (theory 90.5).

*Example X*

The general procedure of Example VII was followed with the exception of reacting 10.6 grams (0.05 mole) of the dianhydride derivative of 1,2,3,4-cyclopentanetetracarboxylic acid and 75 milliliters of 2-ethylhexanol. The mixture was heated at reflux temperature for 1⅔ hours, cooled and then passed through a molecular still at a pressure of 50 microns of mercury with a viscous distillate of product being collected at 130–135° C. The di-2-ethylhexanol ester of 1,2,3,4-cyclopentanetetracarboxylic acid was obtained in a yield of 93.5% of theory.

Example XI

The procedure of Example VII was followed with the exception of reacting 22 grams (0.22 mole) of cyclohexanol and 21.0 grams of the dianhydride of 1,2,3,4-cyclopentanetetracarboxylic acid (0.10 mole). The reactants were heated under reflux conditions for one hour and the residual unreacted alcohol was removed as in Example VII. The yield of the dicyclohexanol ester of 1,2,3,4-cyclopentanetetracarboxylic acid was 39.1 grams which is 95.3% of theory.

Example XII

This example illustrates the preparation of the di-n-hexyl ester of the monoanhydride of 1,2,3,4-cyclopentanetetracarboxylic acid.

To a 250 millimeter flask fitted with a reflux condenser was added 52.5 grams (0.25 mole) of the dianhydride of 1,2,3,4-cyclopentanetetracarboxylic acid and 61 grams (0.6 mole) of n-hexyl alcohol. The mixture was heated at reflux temperature for 1¾ hours and then most of the unreacted alcohol was removed under reduced pressure at 125° C. by means of a rotary evaporator. The di-n-hexyl ester of 1,2,3,4-cyclopentanetetracarboxylic acid was obtained as a very viscous oil in a yield of about 105.8 grams, which was 102% of theory as some residual unreacted alcohol remained.

The viscous oil prepared above was heated until it flowed and then transferred to a molecular still where it was freed of remaining alcohol at a temperature of 120° C. under a pressure of 10–20 microns of mercury. The distillate was returned to the feed flask and passed through the molecular still a second time to give a distillate and a residue. These were combined and passed through the molecular still at 175° C. under a pressure of 50 microns of mercury to obtain a further distillate and a residue.

The residue from the last molecular still distillation above was passed through the molecular still again at a temperature of 180° C. under a pressure of 50 microns of mercury. The clear yellow distillate thus collected was combined with the distillate from the last molecular still distillation above. The refractive index of the composite sample was $n_D^{20}$ 1.4704 at a temperature of 26° C. and it was soluble in ethyl ether and n-hexane. A sample of the composite sample was examined by means of infrared spectroscopy. Examination of the infrared spectrum revealed the presence of an anhydride structure which was verified by means of a ferric hydroxamate test. Thus the diester-diacid derivative was converted to the diester-monoanhydride derivative of 1,2,3,4-cyclopentonetetracarboxylic acid.

The monoester-monoanhydride of 1,2,3,4-cyclopentanetetracarboxylic acid may be prepared by substituting 0.25 of the monoanhydride of 1,2,3,4-cyclopentanetetracarboxlic acid for 0.25 mole of the dianhydride in the above process.

Example XIII

This example illustrates the preparation of soaps from the various diesters of 1,2,3,4-cyclopentanetetracarboxylic acid prepared in Examples VII through XI.

Each of the diester-diacid derivatives of 1,2,3,4-cyclopentanetetracarboxylic acid prepared in Examples VII through XI is reacted in an amount of 0.1 mole with 7.7 grams of sodium hydroxide dissolved in 100 milliliters of water to produce very fluid solutions of the corresponding disodium salts or soaps. The resulting soap solutions are very fluid even at concentrations of 20–35% by weight or higher and are unlike soap solutions of similar concentrations obtained from long chain fatty acid soaps.

The corresponding potassium salts or soaps may be prepared by substituting equimolar amounts of potassium hydroxide for the sodium hydroxide used above. The potassium soap solutions are also very fluid.

The corresponding ammonium soaps or salts are prepared following the above procedure by substituting equimolar amounts of ammonium hydroxide for the sodium or potassium hydroxide. Comparable results are obtained.

Aqueous solutions of the potassium soaps of the di-n-octyl, di-isooctyl and dicetyl esters, and the sodium soap of the didecyl ester, were prepared in varying concentrations by addition of water to the concentrated solutions prepared above and compared with a 5.5% by weight sodium oleate solution to determine the effect of each soap on the surface tension of distilled water. Increments of each soap solution were added by a syringe to 100 milliliter portions of distilled water and the resulting mixtures were stirred for one minute. The surface tension was determined using a Cenco-Du Nouy interfacial tensiometer and the data were recorded. The following results were obtained.

EFFECT OF THE SOAPS OF DIESTERS OF 1,2,3,4-CYCLOPENTANETETRACARBOXYLIC ACID ON THE SURFACE TENSION OF DISTILLED WATER

| | Diesters | | | | | | | |
|---|---|---|---|---|---|---|---|---|
| | n-Octyl | Decyl | Cetyl | Iso-octyl | n-Octyl | Decyl | Cetyl | Iso-octyl |
| | Soap | | | | | | | |
| (a) | K | Na | K | K | K | Na | K | K |
| | Weight Percent Soap Solution | | | | | | | |
| 5.5 | 5.0 | 5.0 | 5.0 | 5.0 | 0.9 | 1.1 | 1.4 | 1.1 |
| Increments, ml. | Surface Tension, Dynes/cm. | | | | | | | |
| 0 | 74.5 | 73.3 | 75.8 | 75.6 | 65.4 | 66.7 | 70.6 | 69.3 | 65.5 |
| 1 | 28.3 | 37.2 | 34.1 | 40.7 | 34.3 | 50.2 | 43.9 | 54.2 | 93.3 |
| 1 | 28.2 | 34.4 | 33.2 | 39.1 | 31.7 | 40.2 | 40.9 | 47.0 | 35.4 |
| 3 | 28.2 | 31.6 | 32.1 | 38.6 | 30.7 | 31.3 | 37.2 | 37.5 | 31.4 |
| 5 | 28.2 | 29.4 | 31.4 | 34.8 | 29.7 | 28.5 | 34.2 | 40.0 | 29.5 |
| 5 | 28.2 | 28.8 | 30.9 | 33.1 | 29.4 | 27.5 | 33.1 | 38.8 | 29.4 |
| 5 | 28.2 | 28.5 | | | | 27.4 | 32.6 | 36.4 | 29.2 |

(a) Sodium oleate.

From the above data, it is apparent that the sodium and potassium soaps of the di-n-octyl and di-decyl esters of 1,2,3,4-cyclopentanetetracarboxylic acid are equivalent to sodium oleate as surface active agents for lowering the surface tension of distilled water. Also, the potassium soap of the dicetyl ester is very effective in lowering the surface tension of distilled water, although not quite as effective as the di-n-octyl and didecyl ester soaps.

*Example XIV*

This example illustrates the use of the diester soaps prepared following the procedure of Example XIII in the aqueous emulsion polymerization of butadiene and styrene.

The specific substances employed in this example as emulsifiers were the disodium salt or soap of the didecyl ester of 1,2,3,4-cyclopentanetetracarboxylic acid and the dipotassium salts or soaps of the di-n-octyl, di-isooctyl and di-cetyl esters of 1,2,3,4-cyclopentanetetracarboxylic acid. The procedure followed in this example was the same as that employed in Example V and the ingredients of the recipe charged to the polymerization bottles were the same as employed in Example V with the exception of the emulsifier which was one of the soaps of the diesters of 1,2,3,4-cyclopentanetetracarboxylic acid mentioned above. The ingredients were polymerized with agitation at a temperature of 50° C. The following results were obtained:

| Emulsifier | Final Percent Total Latex Solids | pH | Prefloc (g.) | Latex Particle Size (A.) | Mechanical Instability (g.) |
|---|---|---|---|---|---|
| Di-n-octyl | 31.0 | 9.1 | 0.1 | 915 | 0.1 |
| Didecyl | 30.1 | 9.5 | Nil | 1,130 | Nil |
| Dicetyl | 31.3 | 9.5 | Nil | 960 | Nil |
| Diisooctyl | 28.7 | 9.1 | Nil | 1,060 | 0.1 |

In the above table, the prefloc was based upon 100 grams of total monomer charge and the mechanical instability was based upon 200 grams of latex at approximately 25% total solids content (TS) by weight.

The polymerization proceeded at a steady reaction rate with no induction period or drying out of the reaction. The resulting latices had the appearance of normal, small particle size latices and there was no unusual amount of prefloc during stripping and handling.

*Example XV*

This example illustrates the use of the soaps of diesters prepared in accordance with Example XIII in the aqueous emulsion polymerization of butadiene and styrene using a "cold rubber" recipe.

The specific substances employed in this example as emulsifiers were the disodium salt or soap of the didecyl ester, and the dipotassium salts or soaps of the di-n-octyl, diisoctyl and dicetyl esters of 1,2,3,4-cyclopentanetetracarboxylic acid. These soaps were used as emulsifiers in the cold rubber recipe of Example VI, and the general procedure employed in Example VI was followed in this example except where noted to the contrary.

The ingredients of the recipes were charged to a series of bottles for conducting polymerizations following laboratory techniques and the polymerizations were allowed to proceed at a temperature of 5° C. until expiration of the indicated reaction time. The following results were obtained:

| Emulsifier | Reaction Time (hrs.) | Final Percent Total Latex Solids | pH | Prefloc | Latex Particle Size (A.) |
|---|---|---|---|---|---|
| Di-n-octyl | 7 | 19.2 | 9.9 | Nil | 705 |
| Didecyl | 92¾ | 18.5 | 10.1 | Nil | 780 |
| Dicetyl | 92¾ | 21.8 | 10.1 | Nil | 780 |
| Diisooctyl | 92¾ | 19.2 | 10.0 | Nil | 790 |

The run using the soap of the di-n-octyl ester had a fast initial reaction rate and went to the indicated conversion without an induction period or dying out of the reaction. The remainder of the runs reacted more slowly, but they were close to the final conversion after the expiration of 24 hours. Continuing the reaction until the indicated 92¾ hours had expired resulted in very little further reaction.

*Example XVI*

This example illustrates the preparation of the methyl, isopropyl, n-butyl, n-hexyl, cyclohexyl, n-octyl and 2-ethylhexyl tetraesters of 1,2,3,4-cyclopentanetetracarboxylic acid.

A solution of the tetraester was prepared by reacting a desired alcohol with 1,2,3,4-cyclopentanetetracarboxylic acid or its dianhydride derivative, and then the tetraester was recovered from the solution. Removal of the last traces of alcohol from the solution was difficult and two methods were employed for isolation of the pure tetraester.

The methods of preparation of the tetraester solution are as follows:

*Method A.*—A solution of 0.025 mole of cis,cis,cis,cis-1,2,3,4-cyclopentanetetracarboxylic acid, 0.3 mole of the desired alcohol, 7.5 milliliters of ethylene dichloride and 0.05 milliliter of concentrated sulfuric acid as an esterification catalyst was refluxed for 17 hours. The resulting solution of the tetraester was extracted with water, aqueous potassium carbonate, and again with water, and was then dried over magnesium sulfate to produce a partially purified tetraester solution. The pure tetraester was isolated from the solution following method E or F below.

*Method B.*—A mixture of 0.25 mole of cis,cis,cis,cis-1,2,3,4-cyclopentanetetracarboxylic acid, 100 milliliters of the desired alcohol and 0.05 milliliter of sulfuric acid as an esterification catalyst was refluxed for 2 hours in a Soxhlet extractor with potassium carbonate in the thimble to produce a solution containing the tetraester and acid esters. The tetraester was then isolated from the solution following method E or F below.

*Method C.*—A mixture of 0.025 mole of cis,cis,cis,cis-1,2,3,4-cyclopentanetetracarboxylic acid, 100 milliters of the desired alcohol and 0.05 milliliter of concentrated sulfuric acid as a catalyst was heated until solution occurred. Then, 50 milliliters of benzene was added and the solution refluxed for 2 hours in a Soxhlet extractor with potassium carbonate in the thimble. The resulting viscous solution was diluted with ether, extracted with water and aqueous potassium carbonate, and dried over magnesium sulfate. The pure tetraester was isolated from this solution following method E or F below.

*Method D.*—The procedure of method C was followed with the exception of substituting the dianhydride derivative of cis,cis,cis,cis-1,2,3,4-cyclopentanetetracarboxylic acid for the free acid employed in method C. Otherwise, method D was the same as method C.

ISOLATION OF THE TETRAESTER

*Method E.*—A tetraester solution prepared by method A, B, C or D was evaporated using a rotary evaporator at room temperature to remove most of the volatile materials, and then the solution was held at a temperature of 100° C. and a pressure of 0.5 mm. for 8 hours to remove remaining traces of volatile materials.

*Method F.*—Most of the solvent of a tetraester solution prepared by method A, B, C or D was removed as in method E and final solvent removal was achieved by molecular distillation in a molecular still.

The specific method used for preparation of each individual tetraester, the method of alcohol removal, percent yield, physical properties of the product, and the saponification equivalent are recorded in the table below:

| Alcohol | Method | | Product | Percent Yield | Saponification Equivalent | |
|---|---|---|---|---|---|---|
| | Prepared | Alcohol Removal | | | Calculated | Found |
| Methyl | A | | Solid, M.P. 68–69° | 48 | | |
| Isopropyl | B | | Mixture (ether insoluble)[1] | | | |
| n-Butyl | D | E | Oil | 70 | 118 | 120 |
| n-Hexyl | C | F | Oil | 80 | 146 | 153 |
| Cyclohexyl | C | F | Glass | 70 | 145 | 151 |
| n-Octyl | C | E | Oil | 67 | 174 | 172 |
| 2-ethylhexyl | D | E | Oil | 72 | 174 | 183 |

[1] With this method, n-butyl alcohol gives an ether soluble product.

The viscosity indices of tetraesters containing 4–24 carbon atoms in each alcoholic residue show that they are suitable as lubricants. The tetraesters have viscosities which fall in the range of automotive crankcase oils (S.A.E. 20, 30 and 40) and thus they may be used as automotive crankcase oils or in other lubricating environments. Properties of tetraesters are given in the table below:

The plastisoles were prepared in each instance by blending the indicated amounts by weight of resin and plasticizer with 3 parts by weight per hundred of stabilizer in a Hobart mixer for one hour at low speed to minimize air entrapment. Samples of the resulting plastisoles were cured at 165° C. for 15 minutes in an air oven to produce the cured resin. The data thus obtained are given below:

| Plasticizer | Parts of Plasticizer per 100 Parts of Vinyl Plastic (weight basis) | Color | Flexibility | Clarity |
|---|---|---|---|---|
| Tetrabutyl | 60 | Brown-yellow | Excellent | Excellent. |
| Tetraoctyl | 30 | Colorless | Good | Good. |
| Do | 40 | Slightly yellow | do | Do. |
| Do | 50 | do | do | Do. |
| Do | 70 | Yellow | do | Do. |

PROPERTIES OF THE TETRAESTERS OF 1,2,3,4-CYCLOPENTANETETRACARBOXYLIC ACID

| Tetraester | Dist. Temp., T. (° C.)/p(μ) | η100° F. (CS) | V.I. | d. 100° F. | Refractive Index | Pour Point (° C.) | Acid # |
|---|---|---|---|---|---|---|---|
| n-Propyl | 115/7 | 98.10 | 41.6 | 1.0835 | 1.4605 | | |
| n-Butyl | 130/15 | 68.22 | 73.2 | 1.0398 | 1.4494 | −40 | 0.9 |
| n-Hexyl | 120/15 | 63.71 | 91.8 | 0.9894 | 1.4602 | | |
| 2-ethylbutyl | 120/15 | 245.22 | 38.2 | 1.0012 | 1.4635 | −35 | |
| n-Octyl | 175/35 | 57.8 | 115.1 | 0.9571 | 1.4550 | [1] −19 | 0.8 |
| i-Octyl | 170/15 | 204.3 | 65.8 | 0.9686 | 1.4636 | −40 | 0.8 |
| 2-Ethylhexyl | 195/20 | 194.9 | 58.4 | 0.9666 | 1.4638 | −40 | |
| Decyl | 190/30 | 180.6 | 66.4 | 0.9398 | 1.4630 | −40 | 0.7 |

Example XVII

This example illustrates the preparation of the isooctyl tetraester of 1,2,3,4 - cyclopentanetetracarboxylic acid using boron trifluoride as the esterification catalyst.

Gaseous boron trifluoride was passed into 200 milliliters of isooctyl alcohol until 27 grams had been absorbed. Then 42 grams (0.2 mole) of the dianhydride of cis,cis,cis,cis-1,2,3,4-cyclopentanetetracarboxylic acid, 135 grams of the boron trifluoride treated isooctyl alcohol, and 250 cc. of dry benzene were added. The apparatus was equipped with a Dean-Stark trap by which the water of reaction was removed as the benzene-water azeotrope.

The mixture was heated at reflux temperature for 18½ hours. At the end of the reaction time, the reaction mixture was washed with water, 5% potassium carbonate, and again with water. The mixture was dried over calcium chloride, topped twice in a molecular still, and then distilled twice to give 94.5 grams of a pale yellow distillate which was the tetraisooctyl ester of 1,2,3,4-cyclopentanetetracarboxylic acid.

Example XVIII

This example illustrates the use of the tetrabutyl and tetraoctyl esters of 1,2,3,4-cyclopentanetetracarboxylic acid as plasticizers in plastisoles based upon Bakelite vinyl plastic QYNV.

What is claimed is:

1. A substance selected from the group consisting of alkyl esters of 1,2,3,4 - cyclopentanetetracarboxylic acid having the formula

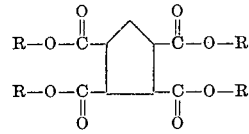

wherein the four R groups are monovalent substitute individually selected from the group consisting of alkyl, hydrogen, alkali metal, alkaline earth metal and —NH$_4$, said monovalent substituent containing 4 through 24 carbon atoms when R is alkyl and at least one R being alkyl, and monoalkyl and dialkyl esters of monoanhydrides of 1,2,3,4 - cyclopentanetetracarboxylic acid wherein each alcoholic residue of the monoalkyl and dialkyl ester groups contains 4 through 24 carbon atoms.

2. An alkyl ester in accordance with claim 1 wherein the said 1,2,3,4 - cyclopentanetetracarboxylic acid is cis, cis,cis,cis-1,2,3,4-cyclopentanetetracarboxylic acid.

3. An alkyl ester of 1,2,3,4 - cyclopentanetetracarboxylic acid in accordance with claim 1 wherein only one R group is alkyl.

4. A monoalkyl ester in accordance with claim 3 wherein the R group contains at least 8 carbon atoms.

5. A monoalkyl ester in accordance with claim 3 wherein the R group contains 8 through 10 carbon atoms.

6. A monoalkyl ester in accordance with claim 3 wherein the said 1,2,3,4 - cyclopentanetetracarboxylic acid is cis,cis,cis,cis-1,2,3,4 - cyclopentanetetracarboxylic acid.

7. A monoalkyl ester in accordance with claim 3 wherein the carbon atoms of the R group are arranged in a straight chain.

8. An alkyl ester of 1,2,3,4 - cyclopentanetetracarboxylic acid in accordance with claim 1 wherein two R groups are alkyl.

9. A dialkyl ester in accordance with claim 8 wherein the R groups each contain at least 8 carbon atoms.

10. A dialkyl ester in accordance with claim 8 wherein the R groups each contain 8 through 10 carbon atoms.

11. A dialkyl ester in accordance with claim 8 wherein the said 1,2,3,4 - cyclopentanetetracarboxylic acid is cis,cis,cis,cis-1,2,3,4-cyclopentanetetracarboxylic acid.

12. A dialkyl ester in accordance with claim 8 wherein the carbon atoms of the two R groups are arranged in a straight chain.

13. An alkyl ester of 1,2,3,4 - cyclopentanetetracarboxylic acid in accordance with claim 1 wherein all four R groups are alkyl.

14. A tetraalkyl ester in accordance with claim 13 wherein the R groups each contain 4 through 16 carbon atoms.

15. A tetraalkyl ester in accordance with claim 13 wherein the R groups each contain 8 through 10 carbon atoms arranged in a straight chain.

16. A tetraalkyl ester in accordance with claim 13 wherein the said 1,2,3,4 - cyclopentanetetracarboxylic acid is cis,cis,cis,cis-1,2,3,4 - cyclopentanetetracarboxylic acid.

17. A tetraalkyl ester in accordance with claim 13 wherein the carbon atoms of the four R groups are arranged in a straight chain.

18. A monoalkyl ester of a monoanhydride of 1,2,3,4-cyclopentanetetracarboxylic acid and the alkali metal, alkaline earth metal and ammonium salts thereof, the alcoholic residue of the monoalkyl ester group containing 4 through 24 carbon atoms.

19. A monoalkyl ester of a monoanhydride in accordance with claim 18 wherein the alcoholic residue of the monoalkyl ester group contains 4 through 16 carbon atoms.

20. A monoalkyl ester of a monoanhydride in accordance with claim 18 wherein the alcoholic residue of the monoalkyl ester group contains 8 through 10 carbon atoms.

21. A monoalkyl ester of a monoanhydride in accordance with claim 18 wherein the said 1,2,3,4 - cyclopentanetetracarboxylic acid is cis,cis,cis,cis-1,2,3,4 - cyclopentanetetracarboxylic acid.

22. A monoalkyl ester of a monoanhydride in accordance with claim 18 wherein the alcoholic residue of the monoalkyl ester group is derived from a straight chain primary alcohol.

23. A dialkyl ester of a monoanhydride of 1,2,3,4-cyclopentanetetracarboxylic acid, each alcoholic residue of the dialkyl ester group containing 4 through 24 carbon atoms.

24. A dialkyl ester of a monoanhydride in accordance with claim 23 wherein the alcoholic residue of each ester group contains 4 through 16 carbon atoms.

25. A dialkyl ester of a monoanhydride in accordance with claim 23 wherein the alcoholic residue of each ester group contains 8 through 10 carbon atoms.

26. A dialkyl ester of a monoanhydride in accordance with claim 23 wherein the said 1,2,3,4 - cyclopentanetetracarboxylic acid is cis,cis,cis,cis-1,2,3,4 - cyclopentanetetracarboxylic acid.

27. A dialkyl ester of a monoanhydride in accordance with claim 23 wherein the alcoholic residue of each of the ester groups is derived from a straight chain primary alcohol.

28. A surface active agent selected from the group consisting of the sodium, potassium and ammonium soaps of the monoalkyl and dialkyl esters of 1,2,3,4 - cyclopentanetetracarboxylic acid, each alcoholic residue of the monoalkyl and dialkyl ester groups containing 4 through 24 carbon atoms.

29. A surface active agent in accordance with claim 28 wherein each alcoholic residue of the monoalkyl and dialkyl ester groups contains 8 through 16 carbon atoms.

30. A surface active agent in accordance with claim 29 wherein the soap is a sodium soap.

31. A surface active agent in accordance with claim 29 wherein the soap is a potassium soap.

32. A surface active agent in accordance with claim 29 wherein the soap is an ammonium soap.

33. A surface active agent in accordance with claim 29 wherein each alcoholic residue of the monoalkyl and dialkyl ester groups contains 8 through 10 carbon atoms.

34. A surface active agent in accordance with claim 29 wherein the soap is a monoester of 1,2,3,4 - cyclopentanetetracarboxylic acid.

References Cited

UNITED STATES PATENTS

| | | | |
|---|---|---|---|
| 2,370,058 | 2/1945 | Maguire | 252—356 |
| 2,528,136 | 10/1950 | Goldstein et al. | 252—356 |
| 2,928,813 | 3/1960 | Bliss | 260—83.7 |
| 2,993,567 | 7/1961 | Schachner | 184—1 |
| 2,994,408 | 8/1961 | Sorem et al. | 184—1 |
| 3,058,942 | 10/1962 | Kirkland et al. | 260—31.8 |
| 3,060,158 | 10/1962 | Albert | 260—83.7 |
| 3,067,162 | 12/1962 | Went et al. | 260—31.8 |
| 3,140,299 | 7/1964 | Loncrini | 260—346.3 |
| 3,194,816 | 7/1965 | Van Volkenburgh et al. 260—346.3 |

OTHER REFERENCES

Alder et al.: Chemical Abstract, volume 59 (1958), column 11762a.

HENRY R. JILES, Primary Examiner.

ALEX MAZEL, MORRIS LIEBMAN, Examiners.

L. T. JACOBS, Assistant Examiner.

UNITED STATES PATENT OFFICE
CERTIFICATE OF CORRECTION

Patent No. 3,346,598

October 10, 1967

Ross Van Volkenburgh et al.

It is hereby certified that error appears in the above numbered patent requiring correction and that the said Letters Patent should read as corrected below.

Column 3, line 65, for "is" read -- as --; column 6, line 73, strike out "for the sodium hydroxide"; columns 15 and 16, in the third table, seventh column, line 5 thereof, for " 1-19" read -- -19(fp) --; column 16, line 60, for "substitute" read -- substituents --.

Signed and sealed this 7th day of January 1969.

(SEAL)
Attest:

Edward M. Fletcher, Jr.
Attesting Officer

EDWARD J. BRENNER
Commissioner of Patents